United States Patent [19]

Atkinson, III et al.

[11] Patent Number: 4,900,138
[45] Date of Patent: Feb. 13, 1990

[54] COMPOSITE GRADIENT INDEX AND CURVED SURFACE ANAMORPHIC LENS AND APPLICATIONS

[75] Inventors: Leland G. Atkinson, III; Duncan T. Moore; J. Robert Zinter, all of Rochester, N.Y.

[73] Assignee: Gradient Lens Corporation, Rochester, N.Y.

[21] Appl. No.: 214,412

[22] Filed: Jul. 1, 1988

[51] Int. Cl.[4] .................. G02B 13/08; G02B 26/10
[52] U.S. Cl. .................................... 350/413
[58] Field of Search .................. 350/413; 360/417

[56] References Cited

U.S. PATENT DOCUMENTS 4,025,157 5/1977 Nartin .
4,805,997 2/1989 Asaham et al. .................. 350/420

OTHER PUBLICATIONS

*Laser Diode to Fiber Coupling Using Anamorphic Gradient Index Lenses* Stagaman & Moore.

*Primary Examiner*—Bruce Y. Arnold
*Assistant Examiner*—Rebecca D. Gass
*Attorney, Agent, or Firm*—Cumpston & Shaw

[57] ABSTRACT

A composite gradient index and curved surface anamorphic lens has a gradient index of refraction and at least one curved surface. Combinations of planar and radial gradients with spherical and cylindrical surfaces are described. A corrector for an light source whose beam divergences are different in orthogonal planes using such a lens and a light beam scanning mechanism are disclosed. In the light beam scanning system, a homogeneous toroidal lens is replaced by a toroidal equivalent gradient-index lens, hereafter referred to as a TEGIL. The lens reduces undesirable displacement of the focus light beam from a scan line on a receptor plane and from the receptor plane itself. The TEGIL comprises a body of gradient-index material having cylindrical faces for generating optical power in a first dimension and whose gradient-index generates optical power in an orthogonal dimension.

36 Claims, 14 Drawing Sheets f#=60 Polygon Diameter=42.1mm, 18 facets
λ=632.8 nm Power (1/mm)        Separation (mm)      Thickness (mm)
$1/f_A$ =0.0110000  $S_1$ =90.303259     $t_A$=2.750
$1/f_B$ =0.0110000  $S_2$ =90.303259     $t_B$=2.750
$1/f_C$ =0.0032218  $S_3$ =0.1000000     $t_C$=10.00
                    $S_4$ =308.382173

Index
Gradient System: $N_{00}$ =1.515089   $N_{10}$ =−0.002/mm²
Homogeneous System: n=1.51089 f#=60  Polygon Diameter=74.5mm, 18 facets
λ=632.8 nm

Power (1/mm)          Separation (mm)        Thickness (mm)

$1/f_A = 0.0056480$   $S_1 = 353.486124$     $t_A = 1.412$
$1/f_B = 0.0074285$   $S_2 = 134.028409$     $t_B = 3.000$
$1/f_C = 0.0154295$   $S_3 = 80.0000000$     $t_C = 3.857385$
                      $S_4 = 326.274263$

Index
Gradient System: $N_{00} = 1.515089$   $N_{10} = -0.002/mm^2$
Homogeneous System: $n = 1.51089$

COMPOSITE GRADIENT INDEX AND CURVED SURFACE ANAMORPHIC LENS AND APPLICATIONS

BACKGROUND OF THE INVENTION

1. Field of the Invention

The present invention relates generally to anamorphic lenses and more particularly to an anamorphic composite lens having a curved surface and a gradient index of refraction, a light beam scanning mechanism incorporating an anamorphic gradient-index lens and to a coupling lens for a multiply divergent and or axially astigmatic light source.

2. Description of the Prior Art

An article entitled "Laser diode to fiber coupling using anamorphic gradient-index lenses" authored by Joan M. Stagaman and Duncan T. Moore appeared in APPLIED OPTICS, Vol. 23, page 1730 on June 1, 1984. The article discusses a lens design approach using anamorphic gradient-index components to examine the problem of coupling light from a laser diode to a multi-mode fiber.

U.S. Pat. No. 4,025,157 which issued on May 24, 1977, to William E. Martin discloses a gradient-index miniature coupling lens. This patent is of interest in disclosing a semiconductor material for the miniature optical lens that is a composite material that is shaped in a configuration of pairs of parallel rectangular side surfaces, each such pair of surfaces being disposed orthogonally relative to each other pair. The composition of the semiconductor material varies between at least one pair of the parallel rectangular flat surfaces for causing a predetermined gradient of refraction which produces a desired focal length for light energy transmitted orthogonally to the gradient-index of refraction.

Laser scanning mechanisms in which a laser beam is focused onto a receptor page in a predefined position are well known in the art. With such a scanning mechanism, information can be written onto the page by scanning the laser beam across the page and alternately turning the beam on and off. The scanning of the laser beam across the page can be accomplished, for example, by a polygon scanner, a galvanometer mirror, a holographic element, or an acousto-optic modulator. Each scanning technique has its own advantages and disadvantages. However, because it is easily visualized, a rotating polygon scanner is illustrated in FIGS. 8 and 11. The disclosed prior art scanning mechanisms in FIGS. 8 and 11 are termed pre-objective scanning systems because the polygon scanners are placed before the objective scan lens. If the polygon scanners are placed after the objective scan lens (FIG. 23), the systems are referred to as post-objective scanning systems.

Independent of scanning technique, an error can result during the scanning operation which is called cross-scan error. This is best described as an undesirable displacement of the light beam perpendicular to the scan direction as the light beam is scanned across the page. This can cause a bowing of the line or undesirable shapes in the printed line. In the polygon scanner of FIG. 8, cross-scan error arising from angular error in a mirror facet of the scanner is depicted. The angular error or pyramid error in the facet misdirects the laser beam and causes the entire scan to be written on a vertically displaced scan line. Similarly, if the rotating scanner wobbles slightly about its rotational axis, a wobbling cross-scan error would result.

Another error resulting from the use of a cylindrical lens of the type shown in FIG. 9, when interposed between the polygon and objective scan lens, is referred to as a field curvature error. The cylindrical lens causes the laser beam to scan on an inward curving focal line rather than on a straight focal line. This field curvature error is rectified by the use of a known toroidal lens, as shown in FIG. 10. When such a lens is interposed between the polygon and objective scan lens, as seen in FIG. 11, a common but relatively expensive solution is provided for reducing cross-scan and field curvature errors.

The cylindrical lens in front of the polygon mirror of FIG. 11 brings the laser beam to a line focus on the mirror facet. The second toroidal lens recollimates the laser beam prior to the flat field objective scan lens. An angular error $\alpha$ in the polygon causes only a translational shift (no angular deviation) in the collimated laser beam between the toroidal lens and the objective scan lens. The objective scan lens maintains focus of the laser beam on the proper scan line.

Although the known toroidal lens shown in FIG. 11 offers a solution to the reduction of the cross-scan and field-curvature errors, the manufacturing of toroidal lenses is difficult and costly, primarily because for each surface two curvatures need to be fabricated.

This invention provides a solution to the problem of cross-scan and field-curvature errors that is of simple design and construction, and economical to manufacture. The solution involves replacing the more costly and difficult to manufacture toroidal lens by a less costly and easy to manufacture toroidal equivalent gradient-index lens, hereinafter referred to as TEGIL.

SUMMARY OF THE INVENTION

An object of the present invention is to provide an anamorphic lens comprising a body of optical material having at least one curved surface and characterized by an optical axis; and having a planar gradient index of refraction in which the planes of equal index are parallel to the optical axis.

Another object of the present invention is to provide an anamorphic lens comprising a body of optical material having a gradient index of refraction and characterized by an optical axis; the body also having at least one curved surface for generating optical power in only one plane parallel to the optical axis.

A more specific object of the invention is to provide a lens for focusing an axially astigmatic light source having a first angular divergence in a first plane and a second different angular divergence in a second plane. The lens comprises a body of optical material having at least one curved surface providing optical power to focus light in said first plane to a predetermined point, and to focus light in said second plane to a different point; said body characterized by a planar gradient-index of refraction providing an increment of optical power to focus light in said second plane to the predetermined point.

Another specific object of the invention is to provide a body of optical material characterized by a planar gradient index of refraction providing optical power to focus light in a first plane to a predetermined point, and to focus light in a second plane to a different point; said body having a cylindrical surface providing an increment of optical power to focus light in said second plane to said predetermined point so that light in both planes is focused to the same point.

Another object of the present invention is to provide an improved light beam scanner mechanism comprising a focusing means for focusing a light beam to a point onto a receptor plane. Means are provided for scanning the point-focused light beam along a scan line on the receptor plane. A TEGIL is interposed in the light beam between the scanning means and the receptor plane for reducing undesirable displacement of the light beam from the scan line and from the receptor plane during scanning. The cylindrical lens that focuses the light beam on the facets of the polygon can also be replaced by a gradient index cylindrical equivalent lens.

Still another object of the invention is to provide a TEGIL which is equivalent to a homogeneous toroidal lens. The TEGIL comprises a body of optical material having a substantially rectangular cross-section, characterized by an optical axis, and opposite flat parallel surfaces between which a gradient-index of refraction variation is produced. The lens body further has opposite curved surfaces of a predetermined radii through which the optical axis extends.

A still further object of the invention is to provide a TEGIL for a pre-objective scanning mechanism having the following numerical data:

| | | |
|---|---|---|
| $\lambda = 632.8$ nm | $r_1 = 627.7720$ mm | $t_c = 10$ mm |
| $N_{00} = 1.515089$ | $r_2 = 127.4257$ mm | |
| $N_{10} = -0.002/\text{mm}^2$ | | | where $\lambda$ is the wavelength of the light beam, $N_{00}$ is the base refractive index of the lens material, $N_{10}$ is the parabolic coefficient of the refractive index polynomial of the lens material, $r_1$ is the cylindrical radius of the front lens curvature, $r_2$ is the cylindrical radius of the rear lens curvature, and $t_c$ is the lens thickness.

Another specific object of the invention is to provide a TEGIL for a post-objective scanning mechanism having the following numerical data:

| | | |
|---|---|---|
| $\lambda = 632.8$ nm | $r_1 = 162.4916$ mm | $t_c = 3.857385$ mm |
| $N_{00} = 1.515089$ | $r_2 = 157.0270$ mm | |
| $N_{10} = -0.002/\text{mm}^2$ | | | where $\lambda$ is the wavelength of the light beam, $N_{00}$ is the base refractive index of the lens material, $N_{10}$ is the parabolic coefficient of the refractive index polynomial of the lens material, $r_1$ is the cylindrical radius of the front lens curvature, $r_2$ is the cylindrical radius of the rear lens curvature, and $t_c$ is the lens thickness.

BRIEF DESCRIPTION OF THE DRAWINGS

The invention will be described with respect to the following drawings, wherein.

DETAILED DESCRIPTION OF THE PREFERRED EMBODIMENTS

Because light beam scanning mechanisms and gradient-index lenses are well known, the present description will be directed in particular to elements forming part of, or cooperating directly with, apparatus in accordance with the present invention. It is to be understood that elements not specifically shown or described may take various forms well known to those skilled in the art.

Figure 1:
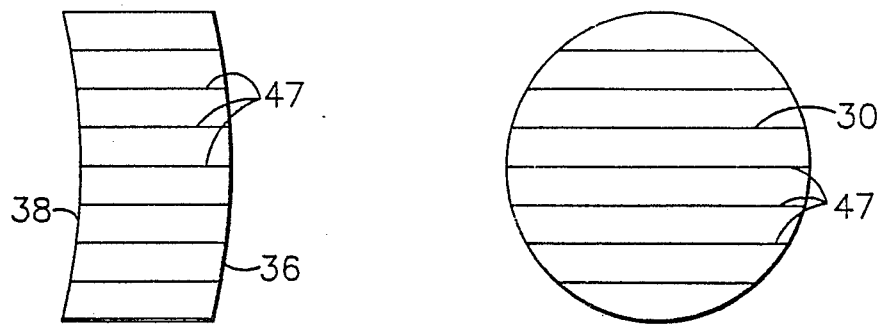
FIG. 1 shows side and front elevational views of one example of an anamorphic planar gradient-index lens.
Figure 2:
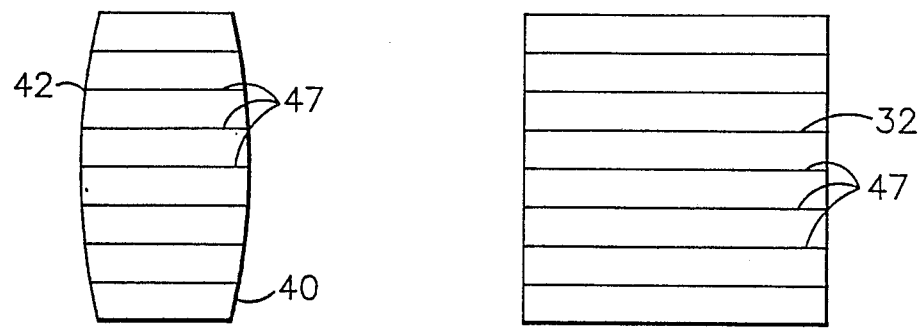
FIG. 2 shows side and front elevational views of another example of an anamorphic planar gradient-index lens.
Figure 3:
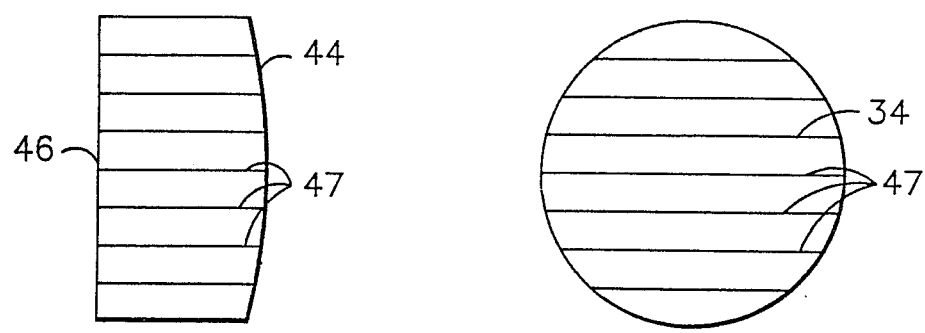
FIG. 3 shows side and front elevational views of still another example of an anamorphic planar gradient-index lens.

With reference to FIGS. 1–3, three examples of an anamorphic planar gradient-index lenses 30, 32, 34 are shown. Lens 30 has front and rear curvatures 36, 38 respectively, lens 32 has front and rear curvatures 40, 42 respectively, and lens 34 has front curvature 44 and a rear planar surface 46. The lenses 30, 32, 34 each have a planar gradient-index of refraction in which the planes of equal index 47 (depicted by parallel lines) are parallel to the optical axis.

Figure 4:
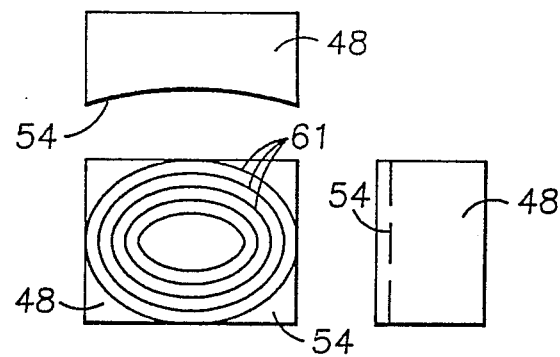
FIG. 4 shows front, top and side elevational views of an anamorphic gradient-index lens with axial symmetry.
Figure 5:
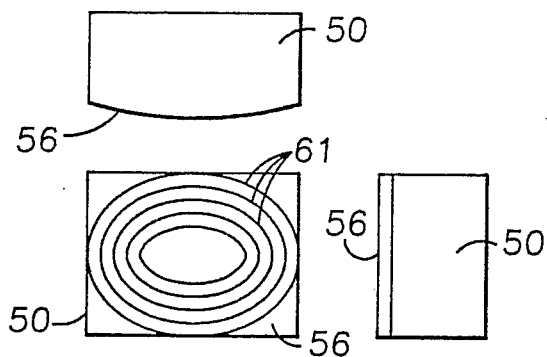
FIG. 5 shows front, top and side elevational views of another example of an anamorphic gradient-index lens with axial symmetry.
Figure 6:
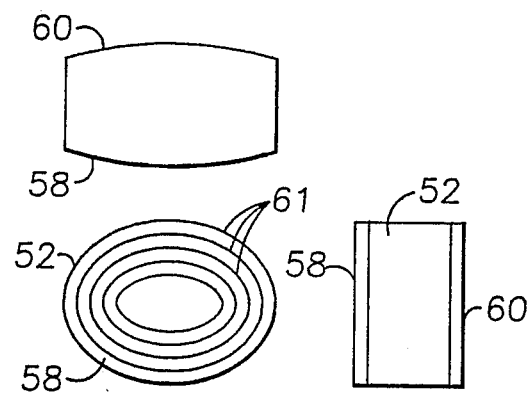
FIG. 6 shows front, top and side elevational views of still another example of an anamorphic gradient-index lens with axial symmetry.

Referring to FIGS. 4–6, three examples of anamorphic gradient-index lenses 48, 50, 52 are disclosed. The lenses have substantially rectangular body cross sections with curvatures on one or more sides thereof. Lens 48 has a concave curvature 54, lens 50 has a convex curvature 56, and lens 52 has opposed convex curvatures 58, 60. The lenses 48, 50, 52 each have an axially symmetric gradient-index of refraction in which the surfaces 61 of constant index are elliptical whose symmetry axis coincides with the optical axis. The surfaces of constant index 61 could also have been depicted as circles or any other shape with axial symmetry.

Figure 7A:
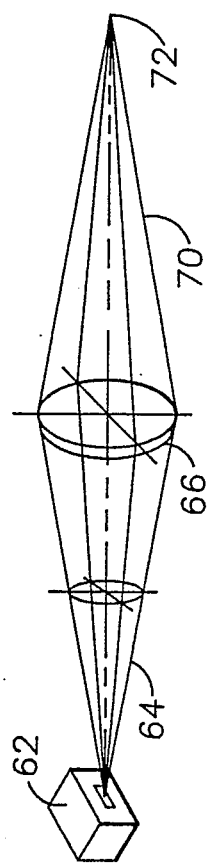
FIG. 7A is a schematic view in which an anamorphic gradient-index lens of this invention is used to effectively focus light from a laser diode, with different beam divergences in orthogonal dimensions, to a single point.
Figure 7B:
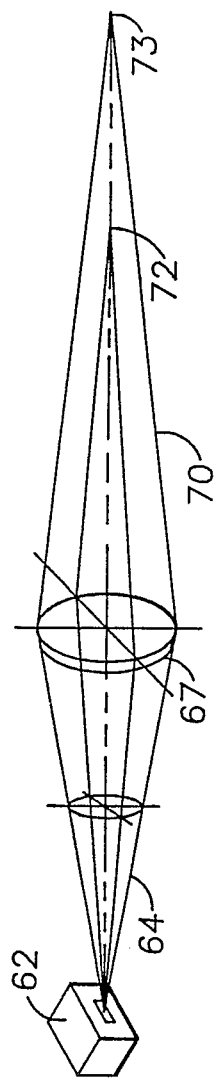
FIG. 7B is a schematic view of the manner in which a conventional spherical lens would focus light from the laser diode.

With reference to FIGS. 7A and 7B, a laser diode 62 emits a cone of light 64 having an elliptical cross-section. An anamorphic gradient-index lens 66 of the type disclosed in FIGS. 1–6 is interposed between the laser diode 62 and a focal plane 68. The lens 66 converts the cone of elliptical cross-section to a cone of light 70 of circular cross-section which is focused to a single point 72 on the focal plane. An example of a use of the planar gradient-index lens 66 would be to couple light into a fiber whose end face is placed in the focal plane.

FIG. 7B shows how light from laser diode 62 would be focused by a conventional spherical lens 67. Because of either axial astigmatism and/or a multiply divergent source, light in the horizontal and vertical planes would be focused on points 72 and 73 respectively.

Figure 8:
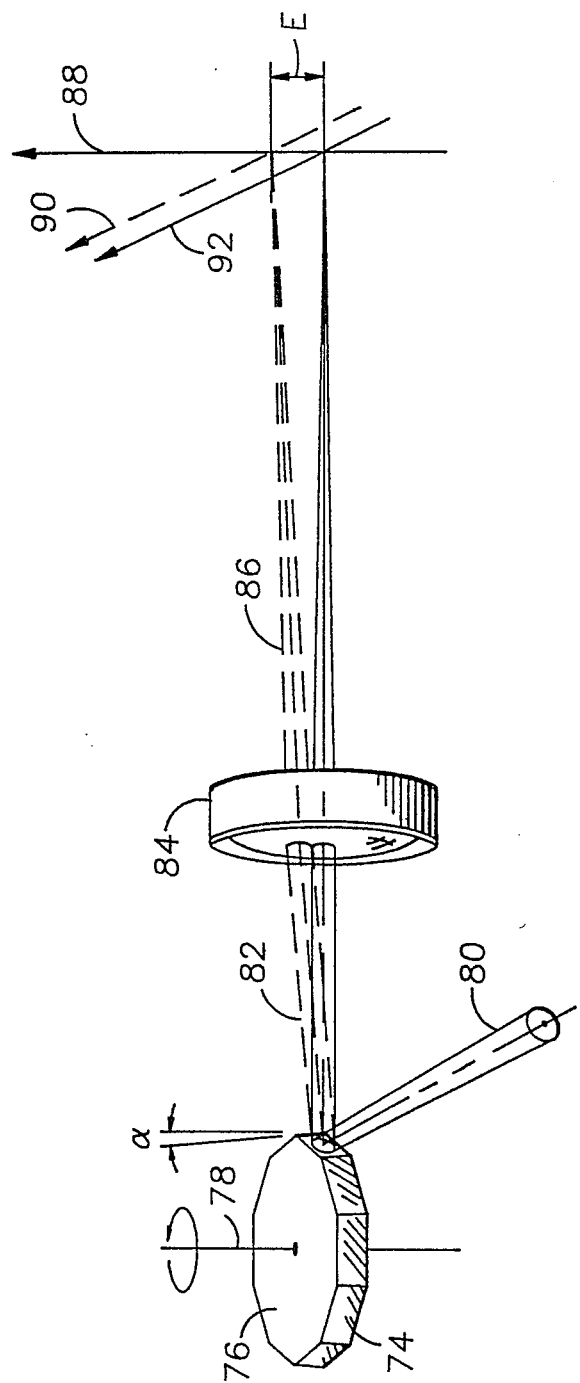
FIG. 8 is a schematic view in perspective of an optical system for a prior art light beam scanning mechanism showing the generation of an uncorrected cross-scan error.

With reference to FIG. 8, an optical system for a light beam scanning mechanism is disclosed of a type well known in the art. As mentioned earlier, any angular error $\alpha$ in a mirror facet 74 of a rotating polygon 76 or any wobbling of the polygon about its rotational axis 78 results in misdirection of an input beam 80. This error will result in a misdirected beam 82, shown dotted in FIG. 8, which passes through the flat-field objective scan lens 84 resulting in a vertically displaced beam 86 at a receptor plane 88, referred to as cross-scan error E. This can cause a bowing in the scan line or other undesirable shapes in the printed line. Tilt error alone would result in the entire scan being written on a displaced and bowed scan line 90 instead of a correct scan line 92. Wobble error alone would cause the scan line to be wavy or bowed.

Figure 9:
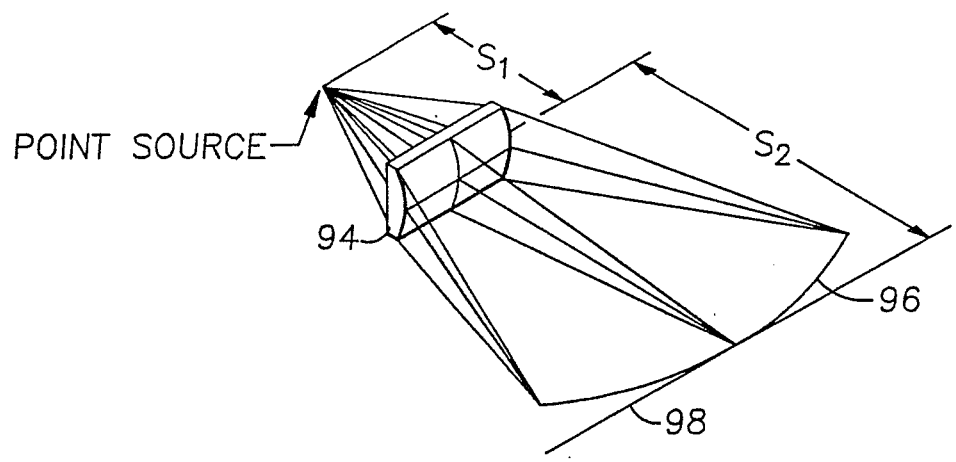
FIG. 9 is a perspective view of a cylindrical lens showing the generation of a cross-scan field curvature error.
Figure 10:
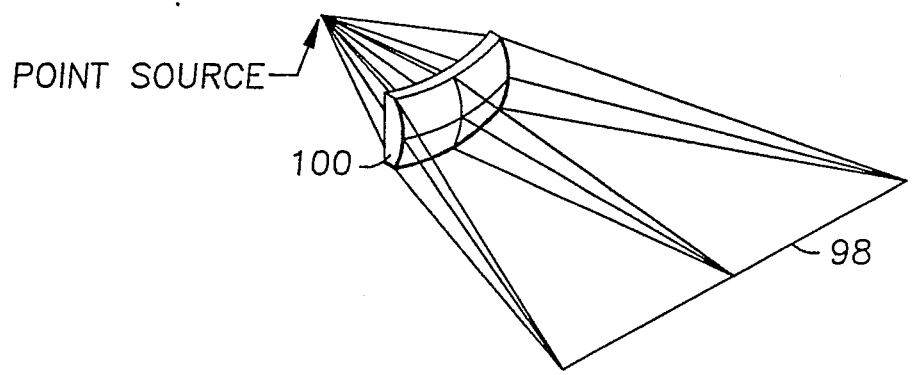
FIG. 10 is a view similar to FIG. 9 of a toroidal lens for correcting the cross-scan field curvature error.
Figure 11:
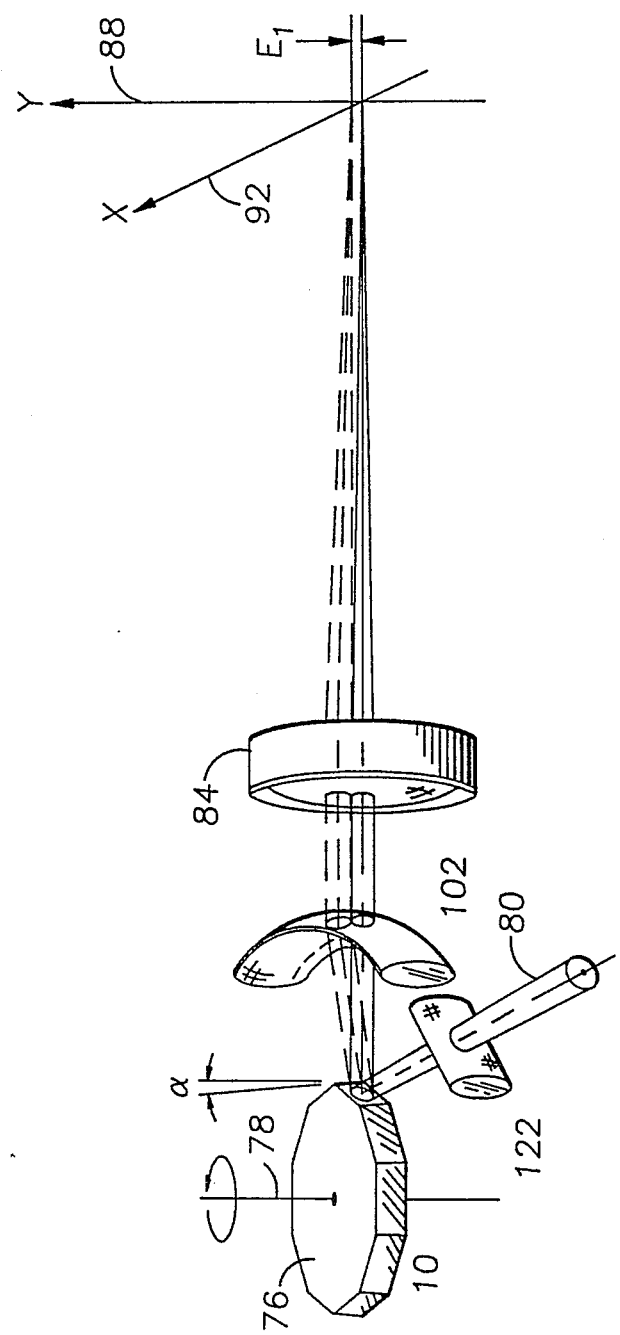
FIG. 11 is a view similar to FIG. 8 of a prior art optical system in which a homogeneous toroidal lens is added to reduce the cross-scan and field curvature errors.

Referring to FIG. 9, any effort to solve the cross-scan error of FIG. 8 by interposing a homogeneous cylindrical lens 94 between the rotating scanning polygon 76 and the objective scan lens 84 causes the beam to scan an inward curving focal line 96 instead of a straight focal line 98. This occurs because at full scan the distance S1 has increased from on axis, thereby causing S2 to decrease. Accordingly although such a lens may reduce the cross-scan error, it introduces an added field curvature error. This additional error is overcome by using a toroidal lens 100 as shown in FIG. 10. Therefore, in order to significantly reduce the cross-scan and field curvature errors, it was necessary to interpose a similar known toroidal lens 102 between the polygon 76 and the objective scan lens 84, as seen in FIG. 11. Although this toroidal lens 102 significantly reduced the cross-scan error to $E_1$, which is exaggerated in the figure, and the field-curvature error, the lens is difficult and costly to manufacture among other things.

Figure 12:
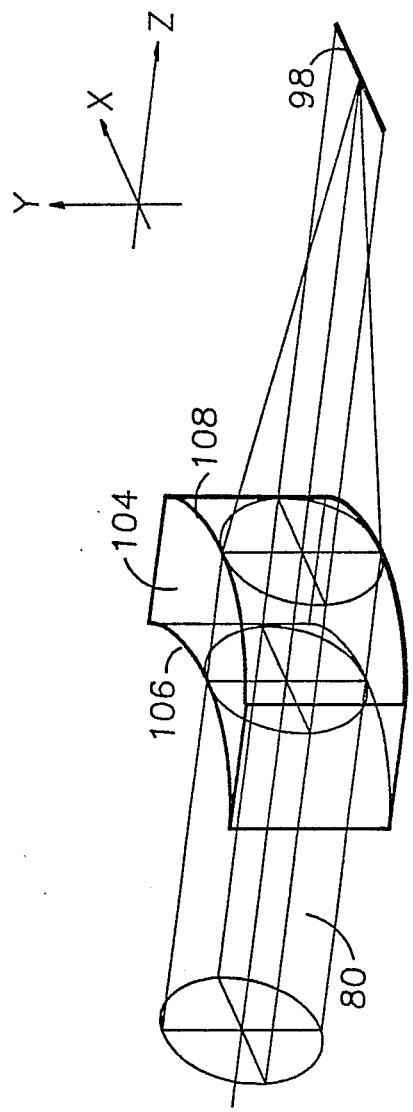
FIG. 12 is a perspective view of a TEGIL with representative rays being focused for correcting the cross-scan and field-curvature errors.

In order to overcome the disadvantages of the homogeneous toroidal lens 102 used in the prior art, a TEGIL element 104 as shown in FIG. 12 was invented. The lens element 104 is essentially rectangular in cross-section, and has a pair of opposed cylindrical surfaces 106, 108 thereof provided with radius of curvatures $r_1$, $r_2$ to provide the toroidal feature of the lens for overcoming the field-curvature error. The power to focus the light beam in one dimension, such as the YZ plane, using the TEGIL element does not come from the surfaces thereof but from the variation in index of refraction as a function of spatial coordinate as given by the following equation $$N = N_{00} + N_{10}Y^2 + N_{20}Y^4 + \ldots$$
$$N_{01}Z + N_{02}Z^2 + \ldots$$

Figure 13:
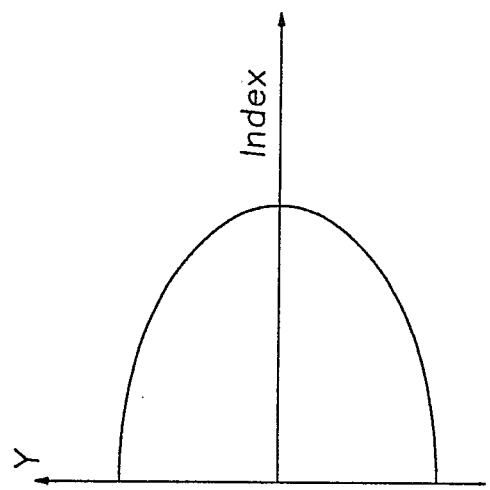
FIG. 13 is an index profile schematic view for the lens element of FIG. 12.

As seen in FIG. 13, the index of refraction is highest along the center line (axial plane) of the element and decreases toward the top and bottom of the lens ($\pm Y$). Focusing of the light beam is caused by the rays of light incident near the edge regions of the gradient-index lens travelling faster through the lens than those near the center. In the lens element disclosed in FIG. 12, the index of refraction varies in only the Y direction and, thus, the surfaces of constant index are planes parallel to the XZ plane.

The power of the lens in the Y dimension is determined by the $N_{10}$ coefficient; higher order coefficients affect the aberrations of the corresponding order. It can be shown that the reciprocal of the focal length, the power, of a thin gradient-index lens can be written by the simple relationship $\phi = -2N_{10}t$, where t is the lens thickness, and $N_{10}$ is the first coefficient of the index polynomial. In the configuration described above, the value of $N_{10}$ is negative, and therefore, the power of the resulting lens is positive. Since there is an index variation only in the Y dimension, there is slight focusing of light in the X dimension, for correction of the inward curving field. Thus, this lens acts in exactly the same way as a toroidal lens.

Figure 14:
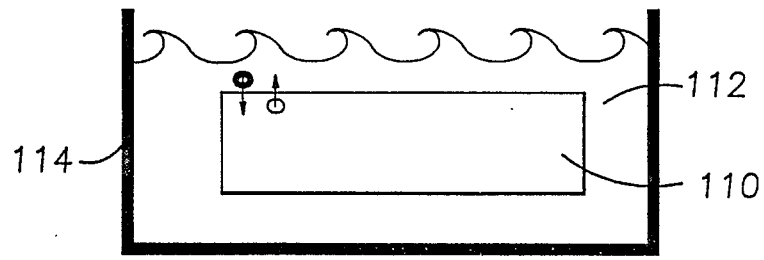
FIG. 14 is a side sectional view of a molten salt bath within which a parent blank is immersed for creating a gradient-index variation within the blank.
Figure 15:
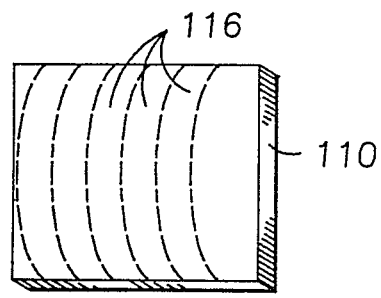
FIG. 15 is a top plan view in perspective showing how the lens blanks are cut out from the a parent blank with the proper curvature.
Figure 16:
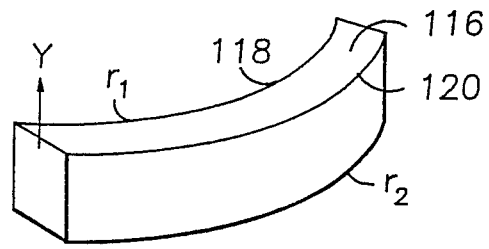
FIG. 16 is a perspective view of a lens blank of the parent blank of FIG. 15.
Figure 17:
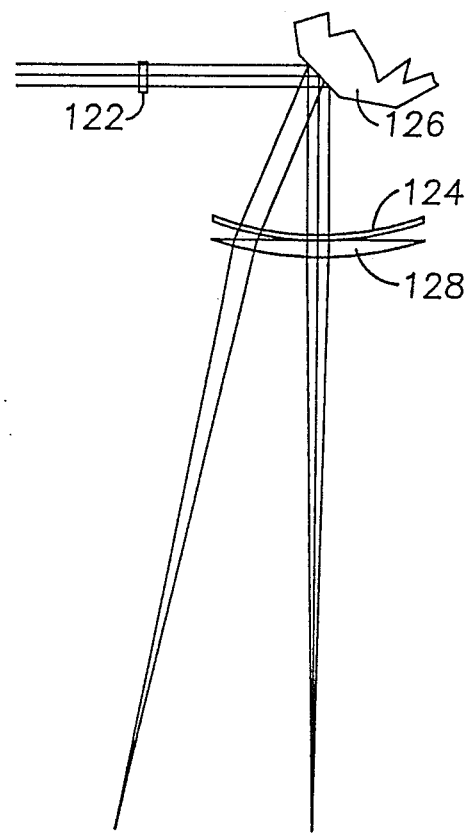
FIG. 17 is a schematic top plan view of the optical system for a pre-objective light beam scanning mechanism.

The advantage of the TEGIL over the homogeneous toroidal lens 102 is in its simplicity of design and ease of manufacture, involving grinding and polishing of flat surfaces or curved surfaces in one dimension only. A result of the above advantages is that the TEGIL is economical to manufacture. One simplified method of manufacture involves preparing a parent rectangular glass or plastic blank 110 having at least the top and bottom surfaces ground and polished flat. As seen in FIG. 14, any suitable technique, such as the ion exchange or diffusion method, can be used to change the composition of the blank from one surface to another to create a desired gradient-index. The ion exchange method involves heating a molten salt bath 112 in a container 114 to a desired temperature of about 525° C., depositing the parent blank 110 into the salt bath where it is kept immersed for a required time. For the prescan system a time of about 85 hours is used and for a post scan system a time of abut 150 hours is required. The parent blank is then removed and the excess baked on salt is ground off. During immersion, Na+ ions from the salt bath diffuse into the parent blank in exchange for Ag+ ions which migrate out of the parent glass material. Diffusion occurring through the edges of the parent blank leads to unwanted gradient regions which are simply cut away. As seen in FIGS. 15 and 16, lens blanks 116 with the desired curvature are then cut out from the remaining parent blank 110 by any suitable cutting tools such as a band saw. The cylindrical surfaces 118, 120 of each lens blank is then ground to an appropriate radius of curvature $r_1$, $r_2$ respectively. These cylindrical surfaces are then polished to form the TEGIL.

Figures 18, 19:
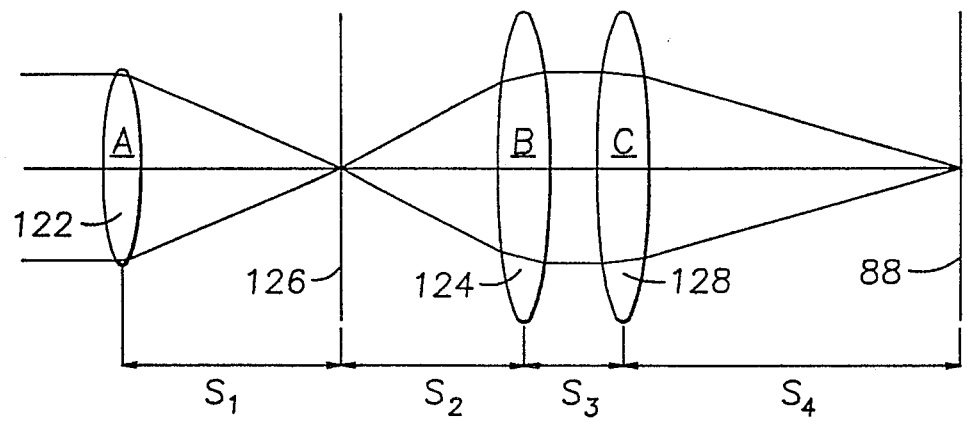
FIG. 18 is a schematic view of the optical system taken in the YZ plane of the pre-objective optical system of FIG. 17.
FIG. 19 is a table disclosing the numerical data for the optical system of FIG. 18.

With reference to FIGS. 17–21, the pre-objective scan design, in which the scanning mechanism (polygon) is placed before the objective scan lens 128, comprises three optical elements and a rotational polygon mirror 126. The polygon is 42.1 mm in diameter and has 18 facets. An unfolded schematic of the system in the YZ plane is shown in FIG. 18. The light enters the first cylindrical corrector lens 122 and is focused onto a facet 126 of the polygon. A second field corrector lens 124 is positioned one focal length away from polygon 126 to recollimate the light. The collimated beam then enters the objective scan lens 84 and is focused onto a recording medium at the receptor plane 88. The scan of the polygon 126 covers an 8.5 inch page. As discussed, any cross scan error due to the polygon wobble or facet tilt will be compensated as the light is recollimated after leaving the field corrector lens 124.

A measure of light beam displacement (cross-scan error) vs. polygon tilt was performed on three types of optical systems. The first system utilized a homogeneous scan lens without cylindrical corrector lenses of the type shown in FIG. 8. The second system utilized a homogeneous scan lens with corrector lenses of the type shown in FIG. 11, and the last optical system utilized a TEGIL. The homogeneous optical system without correctors was used as a control, allowing for a uniform comparison to the optical systems using the corrector lenses.

To maintain continuity between the systems, the thicknesses of the corrector elements were held constant. For this reason, the TEGIL system analysis was performed before the homogeneous corrector system. The power of the gradient-index element is dependent on the thickness of the optical element, whereas for a thin lens, the power of an homogeneous lens is give by $$\Phi = \left(\frac{1}{r_1} - \frac{1}{r_2}\right)/(n - 1)$$

and is thereby independent of the thickness. The optimization routine in the design software selected the values for the front radius of curvature $r_1$ and the rear radius of curvature $r_2$ (FIG. 16) to provide the best image performance of the homogeneous corrector design, while still maintaining equivalent power between the gradient and cylindrical lenses.

As indicated earlier, cross-scan error can be caused, for example, by mirror facet tilt or by the wobble of the rotating polygon 76. Of these two causes, the wobble of the polygon induces the larger image degradation because in addition to introducing facet tilt, the facet 74 moves away from its nominal position, causing a slight defocus error. Hence, the representative case assumes all cross-scan error is due to the polygon wobble, hereinafter referred to as polygon tilt.

Figure 20:
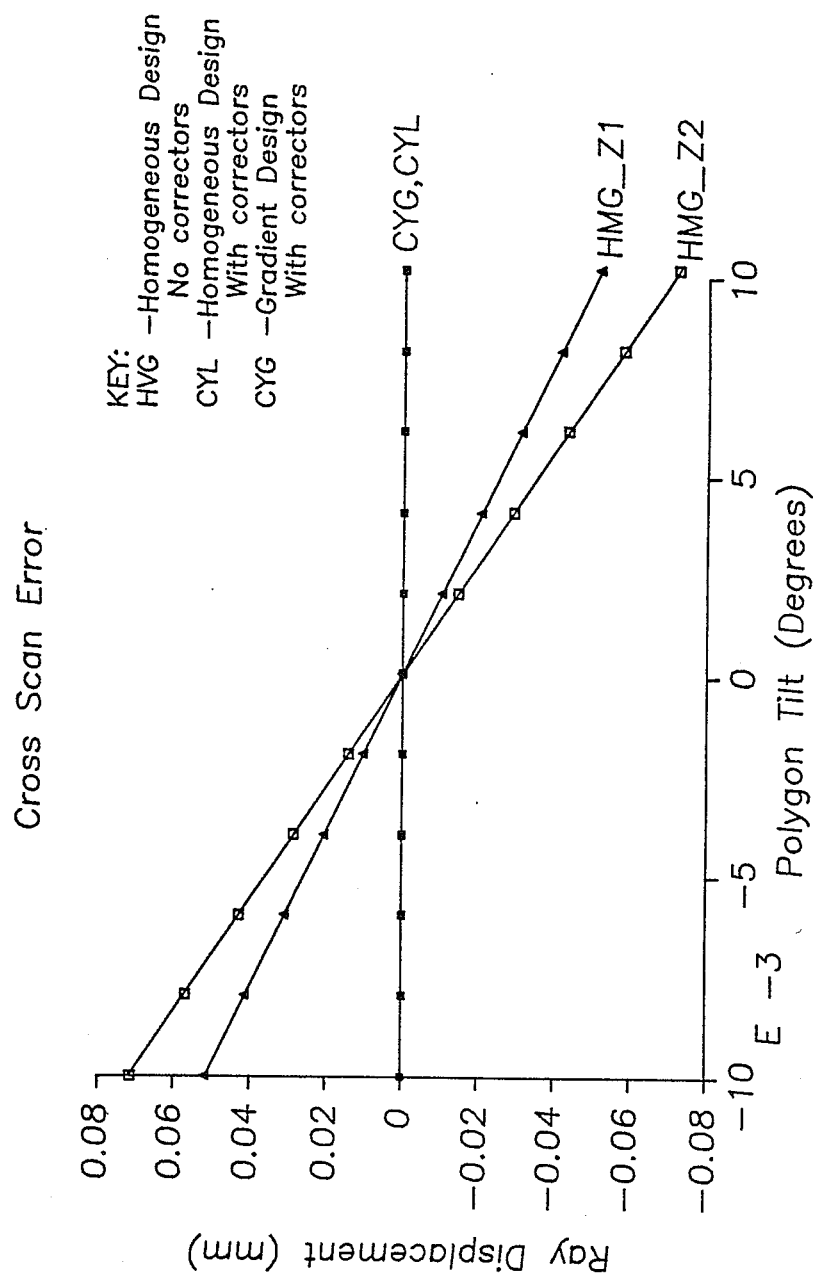
FIG. 20 is a graph showing the cross-scan error in the pre-objective optical system disclosed in FIGS. 17–19 for a homogeneous system with no correctors, a homogeneous system with correctors, and a gradient-index system with correctors.
Figure 21:
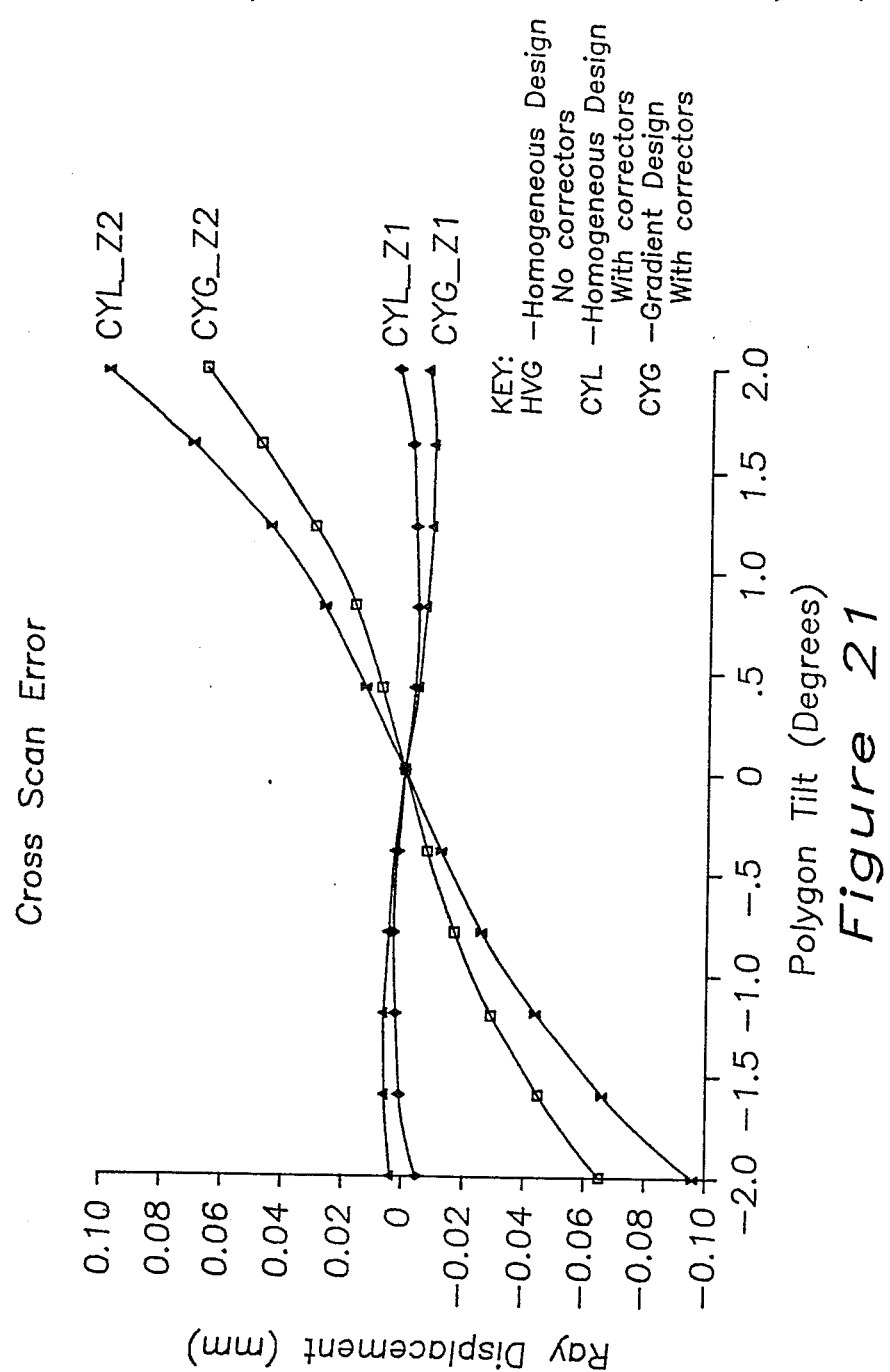
FIG. 21 is a graph detail of FIG. 20 showing the cross-scan error for the homogeneous design with correctors and the gradient-index design with correctors.
Figure 22:
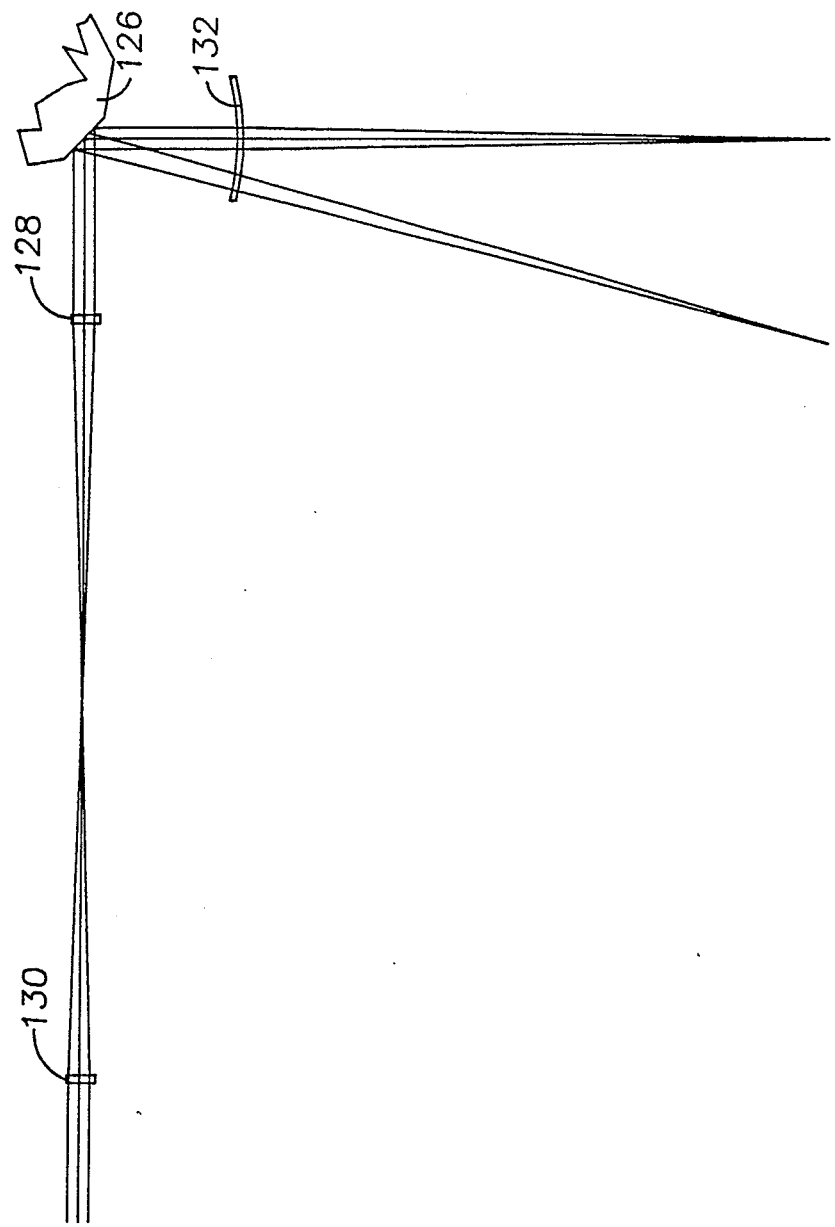
FIG. 22 is a schematic top plan view of the optical system for a post-objective light beam scanning mechanism.

A comparison between the homogeneous lens uncorrected system and the corrected systems are shown in FIGS. 20 and 21. The light beam displacement is plotted as a function of polygon tilt. In the figures, Z1 represents the on-axis case and Z2 the full scan, while HMG refers to the optical system without corrector lenses, CYL the optical system with homogeneous correctors, and CYG the optical system with gradient-index correctors. The maximum light beam displacement at the image should be about one half of the spot size, where the diffraction limited spot diameter for a Gaussian beam is $2\lambda f\#$. For an f/60 system, with $\lambda = 632.8$ nm, this results in a 0.038 mm displacement, which, from FIG. 20, corresponds to a polygon tilt of $5 \times 10^{-3}$ degrees (18 arc seconds) for full scan. On this same scale, the light beam displacement is not seen for the corrector designs.

A much more liberal tolerance on polygon tilt results when the corrector lenses are used in the optical system. As shown in FIG. 21, a polygon tilt of 1.14 degrees can be introduced before introducing a light beam displacement of 0.038 mm. By placing the corrector lens into the scanner optical systems, tolerance limits 2.2 times greater in magnitude than those of the uncorrected system can be allowed.

Figures 23, 24:
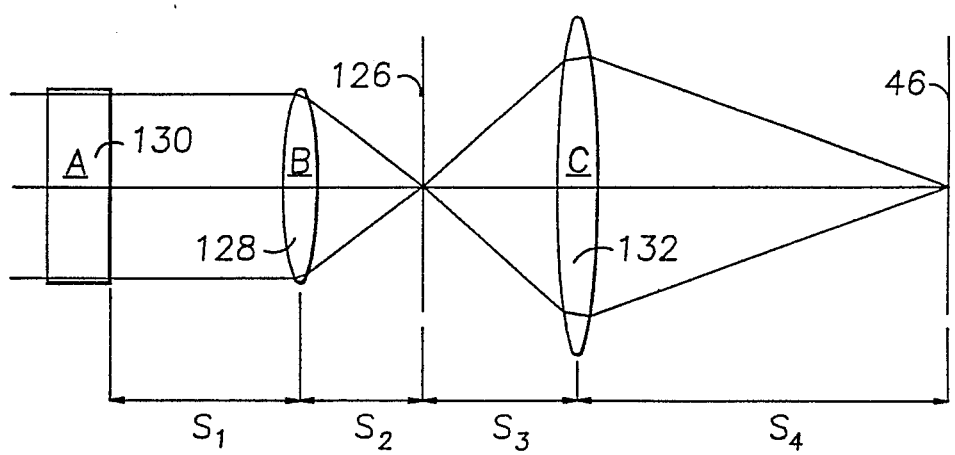
FIG. 23 is a schematic view of the optical system taken in the YZ plane of the post-objective optical system of FIG. 22.
FIG. 24 is a table disclosing the numerical data for the optical system of FIG. 23.

With reference to FIGS. 22–26, a similar study was performed for a post-objective laser scanner in which the scanning mechanism 126 (polygon) is placed after the objective scan lens 128. This type of scanning system is advantageous because the objective scan lens can be a simple design since it is essentially only working on axis. The post-objective scan system also has three optical elements and a rotating polygon mirror with 18 facets. The diameter of the polygon 126 is 74.5 mm. FIG. 23 shows an unfolded post-objective system in the YZ plane. The first element is a cylindrical corrector lens 130 which focuses the input beam in the XZ plane, in front of the objective scan lens 128. The objective scan lens then re-images the focused line of light onto an image receptor plane 46. A field corrector lens 132 is positioned after polygon 126 to correct the field curvature induced by the nature of the scanner in this dimension. In the YZ plane, the first corrector lens 130 has no power, so the beam passes unchanged. The objective scan lens 128 then focuses this beam onto the polygon facet. The field corrector lens 132 then re-images the line of light from the facet to the image or receptor plane 46. Special attention needs to be paid to the first order layout of this optical system to ensure that the f# in both the XZ and the YZ planes match.

Figure 25:
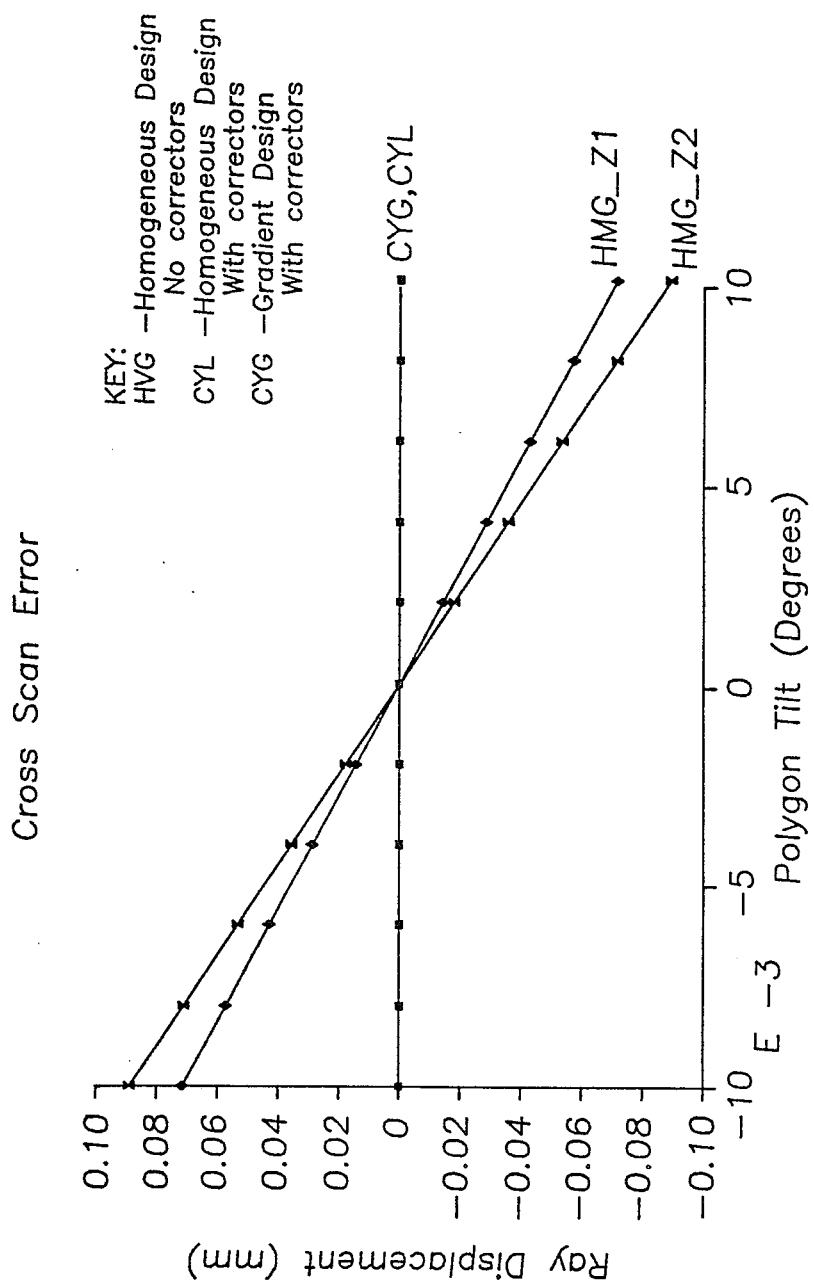
FIG. 25 is a graph showing the cross-scan error in the post-objective optical system disclosed in FIGS. 22–24 for a homogeneous system with no correctors, a homogeneous system with correctors, and a gradient-index system with correctors.
Figure 26:
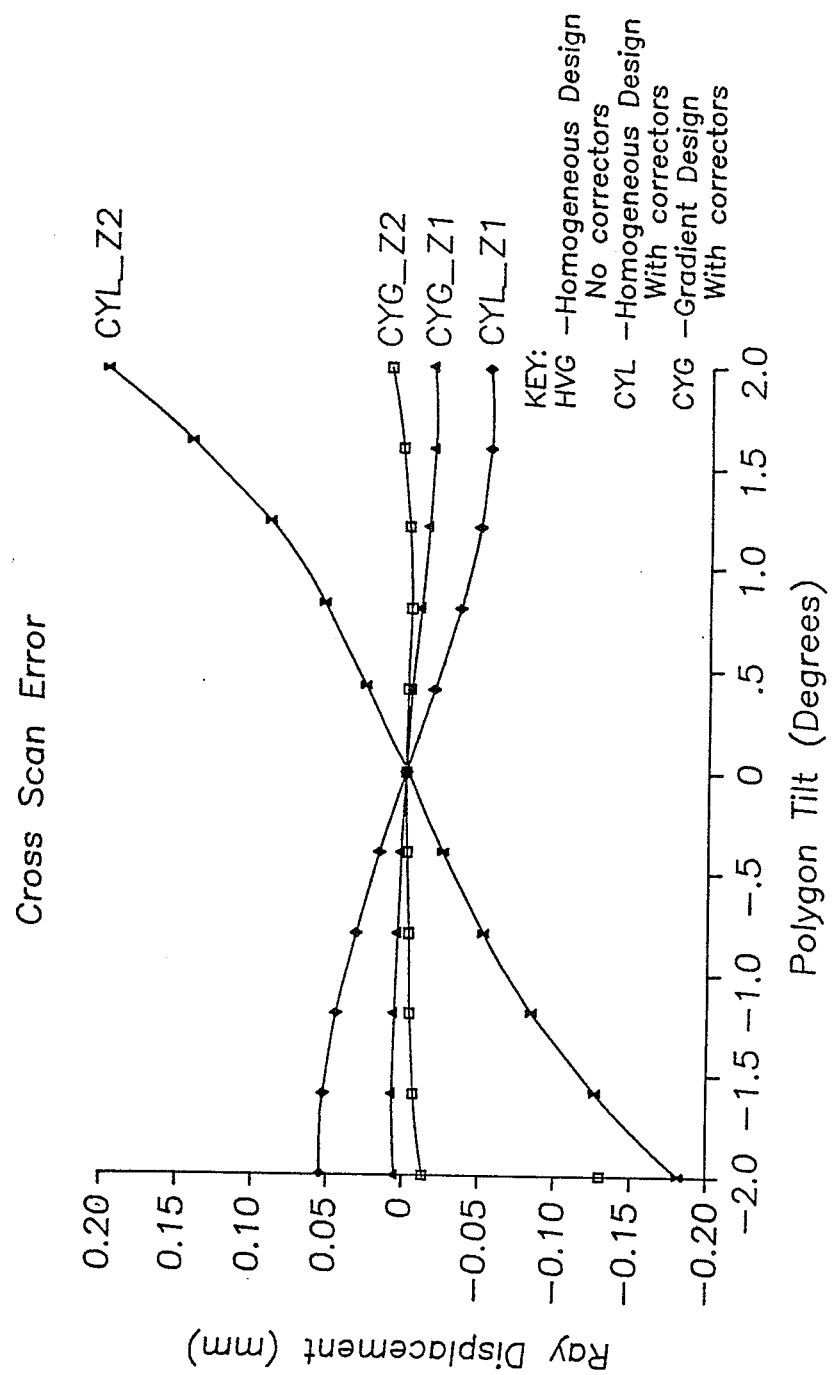
FIG. 26 is a graph detail of FIG. 25 showing the cross-scan error for the homogeneous design with correctors and the gradient-index design with correctors.

The results of the cross-scan error study for the post-objective scanner are shown in FIGS. 25 and 26. FIG. 25 compares a control optical system to the two optical systems with correctors. To produce a light beam with displacement of 0.038 mm, the polygon tilt for the control system must be kept below $3.92 \times 10^{-3}$ degrees (14.1 arc seconds). However, if corrector lenses are used, the polygon tilt can be 0.65 degrees, as seen for the homogeneous lens with correctors, shown in FIG. 26. This tolerance specification is 2.2 times larger in magnitude than the optical system without correctors.

The studies performed with the pre-objective and post-objective optical scanning systems of FIGS. 17-26 have shown that the TEGIL yields comparable results to the homogeneous toroidal lens in correcting for cross-scan error in the pre-objective scanning system, and better results for the post-objective scanning system.

While preferred embodiments of the invention have been shown and described with particularity, it will be appreciated that various changes and modifications may suggest themselves to one having ordinary skill in the art upon being apprised of the present invention. It is intended to encompass all such changes and modifications as fall within the scope and spirit of the appended claims.

We claim:
1. An anamorphic lens comprising:
a body of optical material having at least one curved surface and characterized by an optical axis;
said body characterized by a gradient index of refraction in which the planes of equal index are parallel to said optical axis.
2. The anamorphic lens of claim 1 in which said curved surface comprises a spherical surface.
3. The anamorphic lens of claim 1 in which said curved surface comprises a cylindrical surface.
4. The anamorphic lens of claim 1 in which said curved surface comprises an aspheric surface.
5. The anamorphic lens of claim 1 in which said curved surface comprises a toroidal surface.
6. The anamorphic lens of claim 1 wherein said body of optical material comprises a second curved surface.
7. The anamorphic lens of claim 5 in which said second curved surface comprises a spherical surface.
8. The anamorphic lens of claim 5 in which said second curved surface comprises a cylindrical surface.
9. The anamorphic lens of claim 5 in which said second curved surface comprises an aspheric surface.
10. The anamorphic lens of claim 5 in which said second curved surface comprises a toroidal surface.
11. An anamorphic lens comprising:
a body of optical material having a gradient index of refraction and characterized by an axis of symmetry;
said body having at least one curved surface for generating optical power in only one plane parallel to said axis.
12. The anamorphic lens of claim 11 wherein said gradient index of refraction comprises a radial gradient index.
13. The anamorphic lens of claim 11 wherein said gradient index of refraction comprises a planar gradient index.
14. The anamorphic lens of claim 11 wherein said at least one curved surface comprises a cylindrical surface.
15. The anamorphic lens of claim 11 wherein said at least one curved surface comprises a toric surface.
16. The anamorphic lens of claim 11 wherein said gradient index of refraction comprises an elliptical index of refraction characterized by major and minor optical axes and said curved surface generates optical power in a plane parallel to a selected one of said axes.
17. The anamorphic lens of claim 11 wherein said gradient index of refraction comprises a radial index of refraction characterized by major and minor optical axes and said curved surface generates optical power in a plane parallel to a selected one of said axes.
18. The anamorphic lens of either of claims 1 or 11 wherein said gradient index of refraction comprises a non-linear gradient index of refraction.
19. A lens for focusing a light source having a first angular divergence in a first plane and a second, different, angular divergence in a second plane comprising:
a body of optical material having at least one curved surface providing optical power to focus light in said first plane to a predetermined point, and to focus light in said second plane to a different point;
said body characterized by a planar gradient index of refraction providing an increment of optical power to focus light in said second plane to said predetermined point.
20. The lens of claim 19 wherein said planar gradient index of refraction comprises a one dimensional gradient whose lines of equal index are parallel to said first plane.
21. The lens of claim 19 wherein said curved surface comprises a cylindrical surface.
22. The lens of claim 20 wherein said curved surface comprises a cylindrical surface.
23. The lens of claim 20 wherein said curved surface comprises a cylindrical surface.
24. A lens for focusing a light source having a first angular divergence in a first plane and a second, different, angular divergence in a second plane comprising:
a body of optical material characterized by a planar gradient index of refraction providing optical power to focus light in said first plane to a predetermined point, and to focus light in said second plane to a different point;
said body having a cylindrical surface providing an increment of optical power to focus light in said second plane to said predetermined point.
25. The lens of claim 24 wherein said gradient index of refraction comprises a radial gradient.
26. The lens of claim 25 wherein said curved surface comprises a cylindrical surface.
27. An improved light beam scanning mechanism comprising:
means for focusing a light beam to a point onto a receptor plane;
means for scanning the point-focused light beam along a scan line on the receptor plane; and
toroidal equivalent gradient-index lens means interposed in the light beam between the scanning means and the receptor plane for reducing undesirable
28. A light beam scanning mechanism according to claim 27 wherein the lens means comprises a body of optical material characterized by a gradient-index variation in one dimension providing optical power in one plane including the one dimension which is at right angles to the receptor plane for reducing undesirable displacement of the point-focused light from the scan line.
29. A light beam scanning mechanism according claim 28 wherein said body of optical material comprises front and rear curved surfaces of a predetermined radii lying in a plane substantially parallel to the recep- tor plane for reducing undesirable displacement of the point-focused light from the receptor plane.

30. A light beam scanning mechanism according claim 29 wherein said surfaces are cylindrical surfaces.

31. A light beam scanning mechanism according claim 30 wherein one of said cylindrical surfaces is convex and the other cylindrical surface is concave.

32. A light beam scanning mechanism according to claim 28 wherein the toroidal equivalent gradient-index lens means has the following numerical data:

| $\lambda$ = 632.8 nm | $r_1$ = 627.7720 mm. | $t_c$ = 10 mm |
|---|---|---|
| $N_{00}$ = 1.515089 | $r_2$ = 127.4257 mm. | |
| $N_{10}$ = $-0.002/mm^2$ | | | where $\lambda$ is the wavelength of the light beam, $N_{00}$ is the base refractive index of the lens material, $N_{10}$ is the parabolic coefficient of the refractive index polynomial of the lens material, $r_1$ is the cylindrical radius of the front lens curvature, $r_2$ is the cylindrical radius of the rear lens curvature, and $t_c$ is the lens thickness.

33. A light beam scanning mechanism according to claim 28 wherein the toroidal equivalent gradient-index lens means has the following numerical data:

| $\lambda$ 632.8 nm | $r_1$ = 162.4916 mm. | $t_c$ = 3.857385 mm |
|---|---|---|
| $N_{00}$ = 1.515089 | $r_2$ = 157.0270 mm. | |
| $N_{10}$ = $-0.002/mm^2$ | | | where $\lambda$ is the wavelength of the light beam, $N_{00}$ is the base refractive index of the lens material, $N_{10}$ is the parabolic coefficient of the refractive index polynomial of the lens material, $r_1$ is the cylindrical radius of the front lens curvature, $r_2$ is the cylindrical radius of the rear lens curvature, and $t_c$ is the lens thickness.

34. A toroidal equivalent gradient-index lens which is equivalent to a homogeneous toroidal lens comprising:
a substantially rectangular body having an optical axis, opposite flat parallel surfaces on the body between which a gradient-index variation is produced, and opposed curved surfaces on the body of a predetermined radii through which the optical axis extends.

35. A toroidal equivalent gradient-index lens according to claim 34 having the following numerical data:

| $\lambda$ = 632.8 nm | $r_1$ = 627.7720 mm. | $t_c$ = 10 mm |
|---|---|---|
| $N_{00}$ = 1.515089 | $r_2$ 127.4257 mm. | |
| $N_{10}$ = $-0.002/mm^2$ | | | where $\lambda$ is the wavelength of the light beam, $N_{00}$ is the base refractive index of the lens material, $N_{10}$ is the parabolic coefficient of the refractive index polynomial of the lens material, $r_1$ is the cylindrical radius of the front lens curvature, $r_2$ is the cylindrical radius of the rear lens curvature, and $t_c$ is the lens thickness.

36. A toroidal equivalent gradient-index lens according to claim 34 having the following numerical data:

| $\lambda$ = 632.8 nm | $r_1$ = 162.4916 mm. | $t_c$ = 3.857385 mm |
|---|---|---|
| $N_{00}$ 1.515089 | $r_2$ = 157.0270 mm. | |
| $N_{10}$ = $-0.002/mm^2$ | | | where $\lambda$ is the wavelength of the light beam, $N_{00}$ is the base refractive index of the lens material, $N_{10}$ is the parabolic coefficient of the refractive index polynomial of the lens material, $r_1$ is the cylindrical radius of the front lens curvature, $r_2$ is the cylindrical radius of the rear lens curvature, and $t_c$ is the lens thickness.

* * * * *